H. JUNKERS.
APPARATUS FOR HEATING LIQUIDS.
APPLICATION FILED FEB. 26, 1914. RENEWED MAR. 18, 1920.
1,367,146.
Patented Feb. 1, 1921.
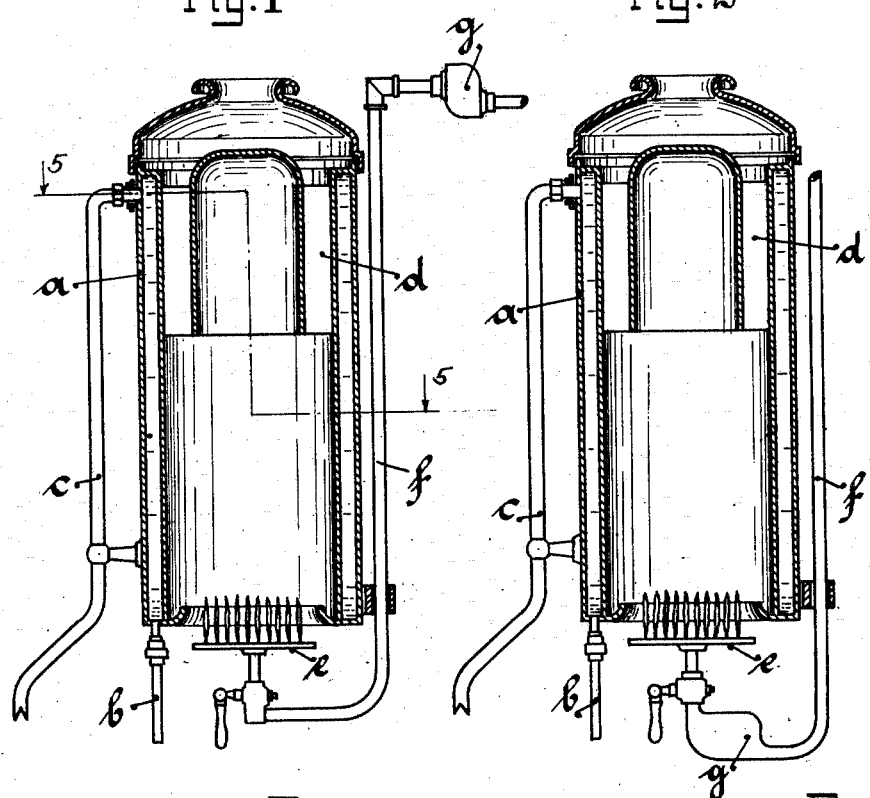
Witnesses:
L. Bates
C. B. Schroeder
Inventor:
Hugo Junkers
By Pennie Davis & Goldsborough
Attys.

UNITED STATES PATENT OFFICE.

HUGO JUNKERS, OF AACHEN, GERMANY.

APPARATUS FOR HEATING LIQUIDS.

1,367,146.  Specification of Letters Patent.  Patented Feb. 1, 1921.

Application filed February 26, 1914, Serial No. 821,264. Renewed March 18, 1920. Serial No. 366,963.

*To all whom it may concern:*

Be it known that I, HUGO JUNKERS, subject of the German Emperor, residing at Frankenburg, Aachen, Germany, have invented certain new and useful Improvements in Apparatus for Heating Liquids, of which the following is the specification.

This invention relates to gas heated apparatus for heating liquids and has for its object to attain a constant consumption of gas at the burners thereof, with the attendant advantages.

Apparatus for heating liquids (warm water generators, bath geysers) have hitherto suffered from the disadvantage of a very fluctuating supply of gas. The quantity of gas flowing through the burner of such an apparatus is determined by two factors: The velocity of exit and the cross-section of the opening. The velocity is a function of the gas pressure; the cross-sectional opening is in this case the cross-section of the holes in the burner or that of the burner nozzles. Thus fluctuations in the quantity of gas are caused either by variations in the gas pressure or by variations in the cross-sectional opening of the burner.

At the point of supply the gas pressure is subject to considerable fluctuation on account of the fluctuating demand on the supply pipe net-work and the resultant frequent drop of pressure. Gas heated apparatus for heating liquids must therefore be so constructed, that they can sustain a fluctuating load corresponding to the fluctuating gas pressure and the varying quantity of gas supplied, or such that they are capable of burning the quantity of gas supplied completely, even at the maximum gas pressure, *i. e.* when the maximum quantity of gas is supplied, in order to avoid incomplete combustion (formation of carbon monoxid or soot). The mean effective output of such an apparatus is lower, frequently very much lower than the maximum output, on account of the fluctuations in the gas pressure. It usually averages 75 to 80% of the possible (maximum) output. Since it is mostly very difficult and often quite impossible to ascertain the limits between which the pressure fluctuates at a particular point of supply and since the amount of fluctuation in the gas pressure varies considerably at different points of supply, it is on the one hand impossible to construct apparatus for heating liquids such that they can be subjected to all fluctuations of gas pressure without disadvantage, and it is on the other hand exceedingly difficult to limit the effect of an excessive rise in pressure by means of correspondingly setting a throttling screw or cock, a device which is at present almost universally employed in apparatus for heating liquids.

Thus, two disadvantages arise from the fluctuation in gas pressure:—

(1.) The practical output of such an apparatus is always considerably less than the possible output for which the apparatus must be constructed so that the full capacity of the apparatus can never be utilized and the apparatus must therefore cost 20 to 25% more than if the fluctuations in the gas pressure were eliminated.

(2.) There is the danger of incomplete combustion (formation of carbonic oxid and soot) arising from the uncertainty in properly limiting the rise of pressure in each individual case.

The second factor which controls the quantity of gas flowing through the burner, viz. the cross-section of the burner, is also subject to variations. Particularly in luminous burners, which are nowadays almost exclusively used in connection with apparatus for heating liquids, alterations in the cross-sectional opening of the burner are frequently caused by the action of the products of combustion. The sulfur contained in the gas combines with the material of the burner to form metallic salts, which, according to the material of the burner, either gradually fill up the holes of the burner, or enlarge these holes by reason of the corrosion resulting from the formation of these salts. Further, it frequently occurs, that the holes in the burner are enlarged with an unskilfully used cleaning needle at the time of the necessary periodic cleaning, or the holes are carelessly enlarged when the supply of gas has diminished on account of the holes becoming stopped up.

In order to avoid this disadvantage as far as possible, gas pressure regulators have been inserted in the gas supply pipe. Such devices, however, only remove the influence of one of the factors affecting the issuing quantity of gas, viz., the variations in the gas pressure, whereas the influence of the second factor, viz., alteration of cross-section of the burner, remains.

Furthermore a gas pressure regulator works with the atmospheric pressure as a basis, i. e. it regulates to a constant pressure over and above the atmospheric pressure.

Since the gas pressure regulator uses the atmospheric pressure as a basis, the regulating part (weighted floating bell or membrane) must always be in communication with the atmosphere. Since the regulating part must be flexible and since the gas must be cut off from the air, it is usual to adopt a fluid or an elastic solid (membrane) as the regulating device.

Such devices introduce the danger of leakage and escape of gas into the air. As a consequence, in many cases the insertion of a gas pressure regulator has not resulted in attaining the desired effect.

The subject of the present invention is designed to avoid all disadvantages in this direction, in that the apparatus for heating liquids is provided with a gas consumption regulator, which does not regulate to a constant gas pressure with a varying gas supply pressure, as does the gas pressure regulator, but passes a constant quantity of gas when there is a fluctuating supply pressure.

The quantity of gas passed in gas consumption regulators (though not in gas pressure regulators) is independent of the cross-sectional opening of the burner. Further, the gas consumption regulator has no connection with the atmosphere, as it does not use the atmosphere as a basis for regulation, but solely uses the potential or kinetic energy contained in the gas, that is to say, the regulating device is only affected by the static or dynamic pressure exerted upon it by the gas.

In apparatus for heating liquids, it is essential to attain a certain maximum output. This output is independent of the quantity of heat supplied in the gas to the heater, i. e. independent both of the calorific value and the weight or volume of gas supplied. The gas consumption regulator, however, only regulates to a constant weight or volume, assuming the density to remain constant, whereas a variation in the density of the gas influences the quantity of gas supplied by the gas consumption regulator, within certain narrow limits. The gas consumption regulator does not take into account the calorific value of the gas. However, the gas density and calorific value are usually constant at any given place, and therefore it is sufficient to set the regulator in accordance with the local condition of gas density and calorific value. Therefore, it is practical to provide the gas consumption regulator with a setting device which permits of a single setting in accordance with these conditions.

For the simpler comprehension of the nature of the invention, the drawings show examples of two forms of gas apparatus fitted with gas consumption regulators in advance of the burner, and also examples of forms of such a gas consumption regulator, which can be set in accordance with the quality of the gas.

Figure 1 shows an arrangement in which the consumption regulator for the burner is inserted in the gas pipe supplying the heater, Fig. 2 shows an arrangement in which the regulator forms an integral part of the heating apparatus.

Figs. 3 and 4 show gas consumption regulators which can be set in accordance with the kind of gas and local conditions.

Fig. 5 is a sectional view taken on the broken line 5—5 of Fig. 1.

In Fig. 1 $a$ is the usual liquid container, which is supplied with cold water by the pipe $b$, the water leaving the heater in a heated condition by means of the pipe $c$. Arranged centrally within the heater is any desired form of heat exchanging device, here shown as an inverted cylinder or hood $d'$ and a series of radially arranged plates $d$, disposed vertically between the cylinder $d'$ and the liquid container $a$. This form of heat exchanging device is well-known and serves to take up the heat from the hot gases that are passing upwardly through the heater and transmits it to the water container $a$. The heater is heated by the burner $e$, which is supplied with gas by the pipe $f$. The heat developed at the burner and the air entering about the burner rise through the draft shaft within the annular water chamber to the heat transferring device $d$ by which heat is absorbed from the hot gases and transferred to the water. $g$ is any desired form of gas consumption regulator, which in the present case is inserted in a gas supply pipe $f$ leading to the heater.

In the arrangement shown in Fig. 2 a similar arrangement is adopted, only that the gas consumption regulator $g$ is close to the heating apparatus or is permanently connected to it before the heater is erected, in order to avoid mistakes in the proper arrangement of the consumption regulator when the heating apparatus is being fixed in position.

If sooting up of the heater arising from variations in the quality of the gas or local circumstances, is to be avoided, an adjustable regulator such for instance as is shown in Figs. 3 and 4 can be used instead of the gas consumption regulator, which in both the before-mentioned cases only regulates for the passage of a constant quantity of gas with a varying pressure.

In the consumption regulator shown in Fig. 3, the regulation is effected by means of a throttling flap of which the resisting effect to the gas pressure can be varied by means of a spring or similar device.

In this case $h$ is a casing in which the throttling flap $i$ is arranged such that it can swing about a pivot therein. Together with the wall $k$ the throttling flap regulates the cross-section for the gas in accordance with the position the gas pressure causes it to take up, in such a manner that the cross-section decreases with an increase of gas pressure, i. e. with a more horizontal position of the flap and vice versa, whereby always the same quantity of gas reaches the holes in the burner.

The arrangement for setting the consumption regulator according to Fig. 3 in accordance with the different calorific values of the respective gases, consists here for example in the arrangement of a weight $l$ on the flap $i$, the position of which can be altered or set by means of the screw $m$. By this alteration, the opposing effect of the flap to the flow of the gas can be altered to suit the kind of gas and local conditions. For instance, if the gas has a greater calorific value than that for which the regulator was originally set, then the weight should be turned in the direction of the axis of the flap, whereby the flap will oscillate in a region giving a smaller cross-section than formerly, so that now less gas will pass through the opening.

In the arrangement according to Fig. 4, the device for setting the gas consumption regulator in accordance with the kind of gas and local circumstances is such, that the position of the wall $n$ can be altered by means of two screws $o$ and $p$. The action of this adjustment is similar to that in the previous case, for instance with a rising calorific value the cross-section of the passage between the flap $i$ and the wall $n$ decreases.

In addition, there can be attained by means of both screws $o$ and $p$, a setting in accordance with the quantity of air for the combustion of the gases, in accordance with the specific gravity or in accordance with the quantity consumed.

Having now particularly described and ascertained the nature of my invention and in what manner the same is to be performed, I declare, that what I claim is:

1. The combination of a liquid heater having a draft shaft, a heat transferring device therein, a container for the liquid to be heated adjacent to the heat transferring device, a burner for heating the air rising through the draft shaft, and a gas consumption regulator connected in the pipe supplying gas to the burner and operating automatically to maintain the consumption of gas at the burner substantially constant notwithstanding variations in the pressure of the gas flowing to the regulator; substantially as described.

2. The combination of a liquid heater having a draft shaft, a heat transferring device therein, a container for the liquid to be heated adjacent to the heat transferring device, and a burner for heating the air rising through the draft shaft, a gas consumption regulator connected in the pipe supplying gas to the burner and operating automatically to maintain the consumption of gas at the burner substantially constant notwithstanding variations in pressure of the gas flowing to the regulator, and means for effecting an adjustment to regulate the amount of gas which the gas consumption regulator allows to flow to the burner; substantially as described.

3. The combination of a liquid heater having a draft shaft, a heat transferring device therein, a container for the liquid to be heated adjacent to the heat transferring device and a burner for heating the air rising through the draft shaft, and a gas consumption regulator connected to the pipe supplying gas to the burner and operating automatically to maintain the consumption of gas at the burner substantially constant notwithstanding variations in the pressure of the gas flowing to the regulator, said regulator comprising a flap pivotally mounted in the conduit through which the gas flows to the burner and arranged to vary the cross-sectional area of the conduit when the flap is moved by the gas passing through the conduit; substantially as described.

4. The combination of a liquid heater having a draft shaft, a heat transferring device therein, a container for the liquid to be heated adjacent to the heat transferring device and a burner for heating the air rising through the draft shaft, a gas consumption regulator connected to the pipe supplying gas to the burner and operating automatically to maintain the consumption of gas at the burner substantially constant notwithstanding variations in the pressure of the gas flowing to the regulator, said regulator comprising a flap pivotally mounted in the conduit through which the gas flows to the burner and arranged to vary the cross-sectional area of the conduit when the flap is moved by the gas passing through the conduit, and means for effecting an adjustment to regulate the freedom with which the flap is moved by the gas; substantially as described.

5. The combination of a liquid heater having a draft shaft, a burner for heating the air rising through the draft shaft, means for absorbing the heat from the heated air passing through the draft shaft and transferring the heat to the liquid to be heated, and a gas consumption regulator connected in the pipe supplying gas to the burner and operating automatically to maintain the consumption of gas at the burner substantially constant notwithstanding variations in pressure of the gas flowing to the regulator, substantially as described.

6. The combination of a liquid heater having a draft shaft, a burner for heating the air rising through the draft shaft, means for absorbing the heat from the heated air passing through the draft shaft and transferring the heat to the liquid to be heated, a gas consumption regulator connected in the pipe supplying gas to the burner and operating automatically to maintain the consumption of gas at the burner substantially constant notwithstanding variations in pressure of the gas flowing to the regulator, and means for effecting an adjustment to regulate the amount of gas which the gas consumption regulator allows to flow to the burner, substantially as described.

7. The combination of a liquid heater having a draft shaft, a burner for heating the air rising through the draft shaft, means for absorbing the heat from the heated air passing through the draft shaft and transferring the heat to the liquid to be heated, and a gas consumption regulator connected to the pipe supplying gas to the burner and operating automatically to maintain the consumption of gas at the burner substantially constant notwithstanding variations in the gas flowing to the regulator, said regulator comprising a flap pivotally mounted in the conduit through which the gas flows to the burner and arranged to vary the cross-sectional area to the conduit when the flap is moved by the gas passing through the conduit, substantially as described.

In testimony whereof I have signed my name to this specification in the presence of two subscribing witnesses.

HUGO JUNKERS

Witnesses:
 LUDWIG WAGENSSIL,
 L. MÜLLER.